H. A. WATERMAN, L. C. BRADLEY & W. K. ANDREW.
STEERING MECHANISM FOR TRACTION ENGINES.
APPLICATION FILED AUG. 17, 1910.
1,001,181.
Patented Aug. 22, 1911.
3 SHEETS—SHEET 3.
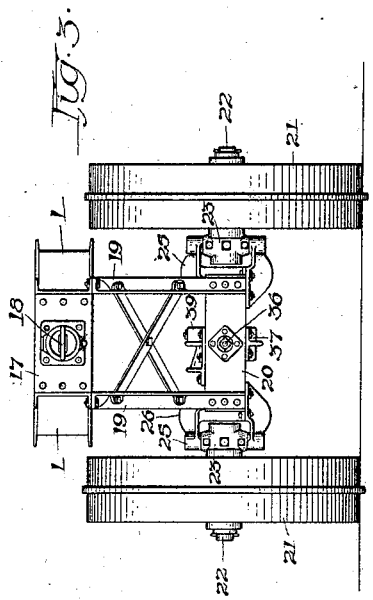
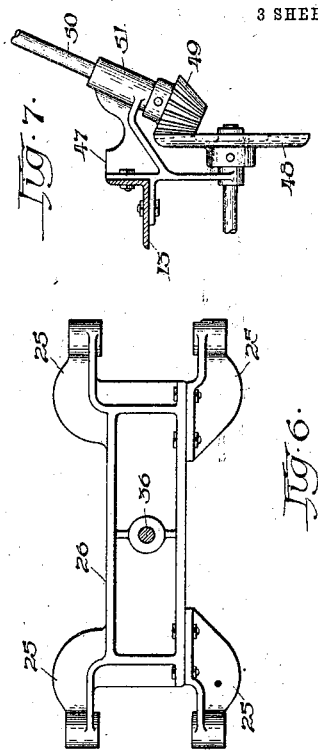
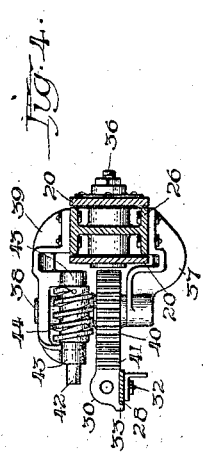
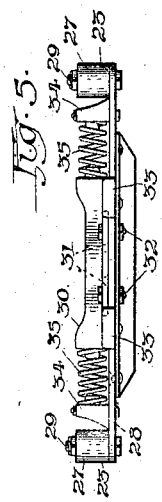
Witnesses:
Inventors
Henry A. Waterman, Lyford C. Bradley
and William K. Andrew.
By E. W. Burgess
Attorney.

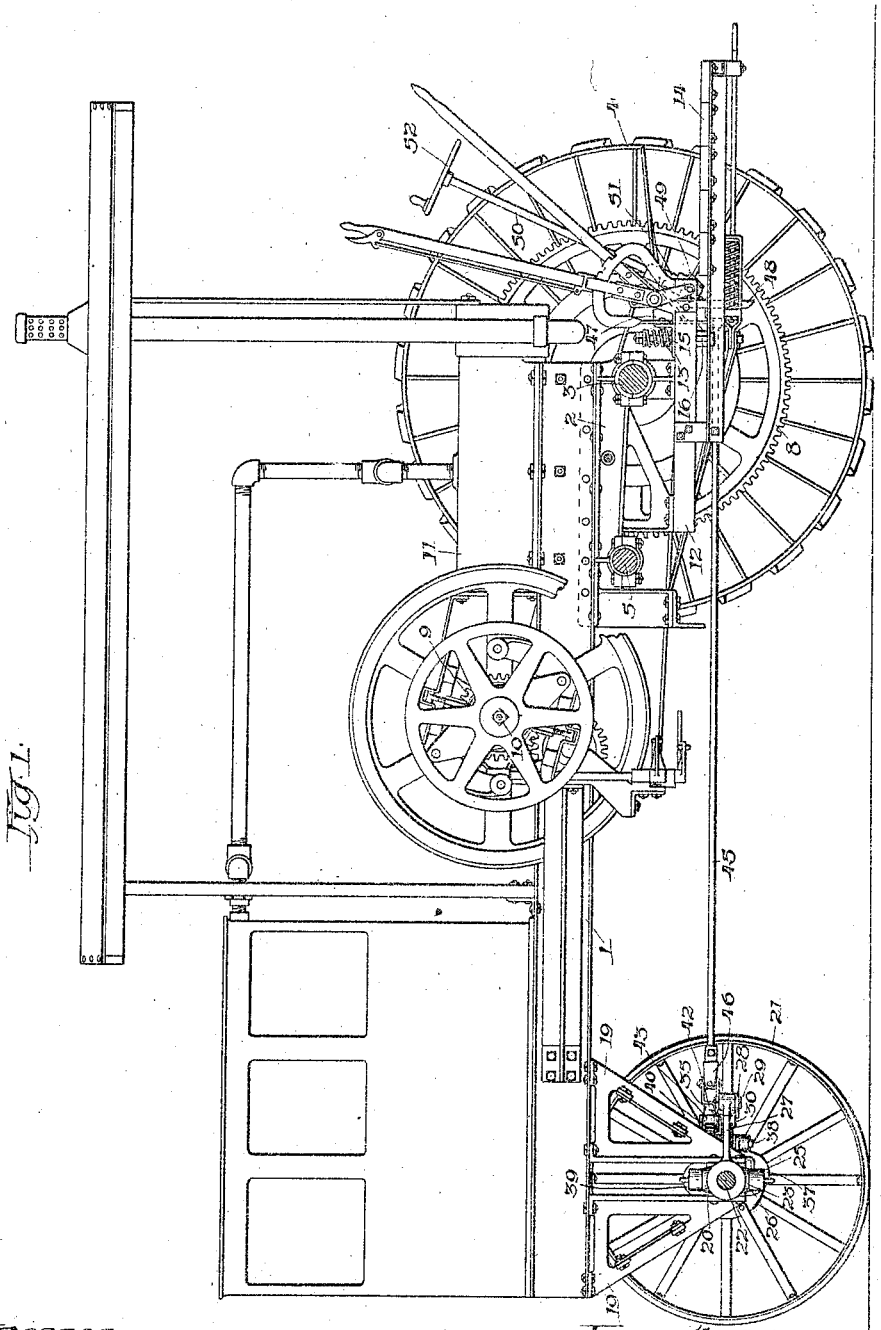

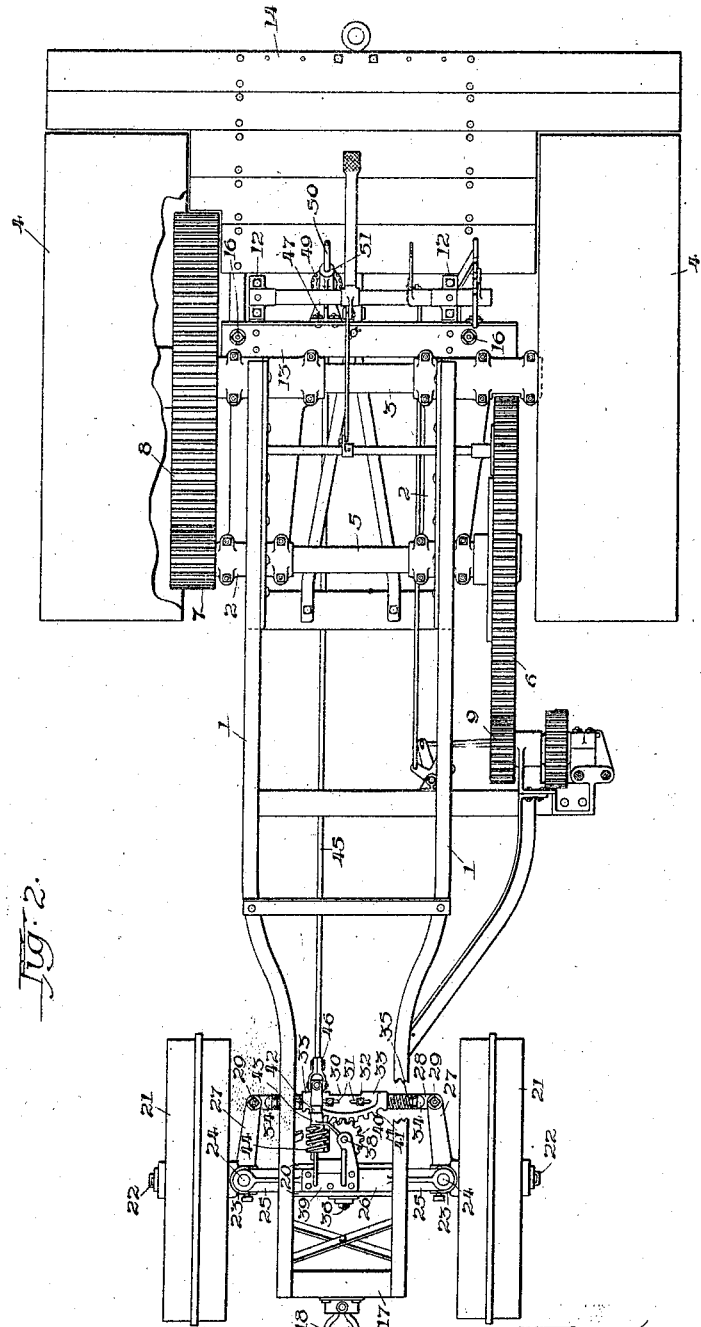

UNITED STATES PATENT OFFICE.

HENRY A. WATERMAN, LYFORD C. BRADLEY, AND WILLIAM K. ANDREW, OF MILWAUKEE, WISCONSIN, ASSIGNORS TO INTERNATIONAL HARVESTER COMPANY, A CORPORATION OF NEW JERSEY.

STEERING MECHANISM FOR TRACTION-ENGINES.

1,001,181.  Specification of Letters Patent.  Patented Aug. 22, 1911.

Application filed August 17, 1910. Serial No. 577,633.

*To all whom it may concern:*

Be it known that we, HENRY A. WATERMAN, LYFORD C. BRADLEY, and WILLIAM K. ANDREW, citizens of the United States, residing at Milwaukee, in the county of Milwaukee and State of Wisconsin, have invented certain new and useful Improvements in Steering Mechanism for Traction-Engines, of which the following is a specification.

Our invention relates to traction engines, and in particular to means whereby the wheels supporting the forward end of the truck frame may be adjusted angularly relative to said frame in a manner to determine the direction of travel of the machine; the object of our invention being to provide a mechanism strong and durable in construction and easily and readily manipulated for the purpose required. We attain these objects by means of the mechanism illustrated by the accompanying drawings, in which—

Figure 1 is a side elevation of a traction engine with one of the supporting and one of the traction wheels removed and having our invention forming a part thereof; Fig. 2 represents a top plan view of a truck frame mounted upon steering and traction wheels and showing the friction and steering mechanism and the power transmitting means; Fig. 3 is a front end elevation of the truck frame and part of the steering mechanism; Fig. 4 is a sectional elevation of part of the steering mechanism; Fig. 5 is a detail of the yielding connection between the wheel supporting cranks and the steering gear mechanism; Fig. 6 is a side elevation of the front axle member; and Fig. 7 is a detail of part of the steering mechanism.

The same reference characters designate like parts throughout the several views.

The truck frame includes longitudinally arranged members 1 upon opposite sides thereof, having secured to their rear ends gear frame members 2, in which is journaled a rotatable axle 3, upon which are mounted traction wheels 4 and a countershaft 5, having a gear wheel 6 secured to one end thereof and a pinion 7 to its opposite end, the pinion meshing with a gear wheel 8 upon the axle, and the gear wheel 6 with a driving pinion 9, deriving motion from an engine shaft 10 forming part of an explosive engine 11 mounted upon the truck frame.

12 represents supplemental truck frame members secured to members 2 and extending in rear thereof, are connected at their rear ends by means of a transverse bar 13, and 14 represents an operator's platform, having its forward end pivotally connected with frame members 12 and having its rear end yieldingly supported by means of springs 15 and rods 16 connecting it with the transverse bar 13.

The forward ends of frame members 1 approach each other and are connected by means of a cross tie 17, having a draft link 18 pivotally connected therewith intermediate its ends.

19 represents depending triangular brackets secured to the lower sides of frame members 1 at their forward ends, and 20 represents transversely arranged bars secured to the lower ends of the triangular members and spaced apart in a manner to receive between them an axle member 26.

Front wheels 21 are journaled upon spindles 22 that are secured to vertically arranged brackets 23 that are adapted to turn upon vertically arranged pivot pins 24 connecting them with the forked ends 25 of axle member 26, and 27 represents rearwardly extending arms integral with the vertical brackets, the rear ends of the arms being pivotally connected with opposite ends of a steering bar 28 by means of vertically arranged pins 29.

30 represents a plate slidably mounted upon the upper side of the steering bar by means of slotted openings 31 and bolts 32, and having downwardly extending lip members 33 that engage with the rear edge of the bar in a manner to retain the plate in operative position.

34 represents vertical lugs secured to the upper side of the steering bar adjacent the pivotal connection of the arms therewith, and 35 compression springs operative between the lugs and opposite ends of plate 30 in a manner to cushion a sliding movement thereof relative to the bar in either direction.

Axle member 26 is provided with an opening at its middle portion that receives a pivot bolt 36 connecting it with cross members 20 in a manner permitting a rocking movement thereof relative to said members.

37 represents a bracket secured to the lower side of axle member 26 and projecting rearward is provided with a vertical opening that receives a pin 38, and 39 represents a corresponding bracket secured to the upper side of the axle member and provided with an opening that receives the upper end of pin 38, and journaled upon the body of the pin is a combined worm wheel and pinion 40, the pinion meshing with gear segment 41 formed upon the front side of the sliding plate 30.

42 represents a short shaft journaled in bearings 43 carried by bracket 39 and arranged at right angles in a fore and aft direction relative to axle member 26, and having secured thereto a worm 44 that engages with member 40.

45 represents a steering shaft arranged longitudinally relative to the truck frame, having its forward end connected with shaft 42 by means of a universal coupling 46, and its rear end journaled in a bracket 47 secured to the transverse bar 13 of the truck frame and having a gear wheel 48 secured thereto that meshes with a pinion 49 secured to the lower end of a shaft 50 that is journaled in a bearing 51 forming part of the bracket, and extending rearward and upward therefrom is provided with a hand wheel 52 whereby the steering mechanism may be conveniently manipulated by the operator.

What we claim as our invention and desire to secure by Letters Patent, is:

1. A steering mechanism for traction engines including, in combination, a truck frame, traction wheels supporting the rear end of said truck frame and steering wheels supporting its front end, the connections between said steering wheels and said truck frame including transversely arranged bars secured to said truck frame and spaced apart, an axle member received between said bars and pivotally connected therewith intermediate their ends, said axle member having forks at opposite ends thereof, brackets connected with said forks by means of vertically arranged pivot pins, said brackets having integral therewith spindles, upon which spindles are mounted rearwardly extending arms, a transversely arranged steering bar having its opposite ends pivotally connected with the rear ends of said arms, a plate mounted upon said steering bar and adapted to move longitudinally thereon, compression springs mounted upon said bar and contacting with said plate in a manner to resist a movement thereof in either direction, and a longitudinally arranged rotatable steering shaft mounted upon said truck frame and operatively connected with said plate in a manner to cause it to move in either direction.

2. A steering mechanism for traction engines including, in combination, a truck frame, traction wheels supporting the rear end of said truck frame and steering wheels supporting its front end, the connection between said steering wheels and said truck frame including transversely arranged bars secured to said truck frame and spaced apart, an axle member received between said bars and pivotally connected therewith intermediate their ends, said axle member having forks at opposite ends thereof, brackets connected with said forks by means of vertically arranged pivot pins, said brackets having integral therewith spindles, upon which spindles are mounted rearwardly extending arms, a transversely arranged steering bar having its opposite ends pivotally connected with the rear ends of said arms, a plate mounted upon said steering bar and adapted to move longitudinally thereon, compression springs mounted upon said bar and contacting with said plate in a manner to resist a movement thereof in either direction, a toothed rack forming part of said plate, a pinion journaled in bearings carried by said axle member and engaging with said rack, a worm operative to rotate said pinion, a longitudinally arranged rotatable steering shaft mounted upon said truck frame, and a universal coupling connecting said shaft with said worm.

3. A steering mechanism for traction engines including, in combination, a truck frame, traction wheels supporting the rear end of said truck frame and steering wheels supporting its front end, the connections between said steering wheels and said truck frame including transversely arranged bars secured to said truck frame and spaced apart, an axle member received between said bars and pivotally connected therewith intermediate their ends, said axle member having forks at opposite ends thereof, brackets connected with said forks by means of vertically arranged pivot pins, said brackets having integral therewith spindles, upon which spindles are mounted rearwardly extending arms, a transversely arranged steering bar having its opposite ends pivotally connected with the rear ends of said arms, a plate mounted upon said steering bar and adapted to move longitudinally thereon, compression springs mounted upon said bar and contacting with said plate in a manner to resist a movement thereof in either direction, a segmental toothed rack forming part of said plate, brackets secured to the upper and lower sides of said axle member, a combined pinion and worm wheel journaled upon a vertical pin supported by said brackets, a worm arranged upon a longitudinal shaft journaled in said brackets, a longitudinally arranged rotatable steering shaft mounted upon said truck frame, and a universal coupling connecting said shaft with said worm shaft.

HENRY A. WATERMAN.
LYFORD C. BRADLEY.
WILLIAM K. ANDREW.

Witnesses:
 I. A. McINTYRE,
 G. D. WIEDEMANN.